US012654661B2

(12) United States Patent
Stamp et al.

(10) Patent No.: US 12,654,661 B2
(45) Date of Patent: Jun. 16, 2026

(54) METHOD AND CONTROL ARRANGEMENT FOR CONTROLLING BRAKING OF A VEHICLE

(71) Applicant: Scania CV AB, Södertälje (SE)

(72) Inventors: Alexander Stamp, Huddinge (SE); Casper Johansson, Hägersten (SE); Stefan Karlberg, Segeltorp (SE); Filip Larsson, Södertälje (SE)

(73) Assignee: Scania CV AB, Södertälje (SE)

( * ) Notice: Subject to any disclaimer, the term of this patent is extended or adjusted under 35 U.S.C. 154(b) by 35 days.

(21) Appl. No.: 18/750,155

(22) Filed: Jun. 21, 2024

(65) Prior Publication Data

US 2025/0001986 A1    Jan. 2, 2025

(30) Foreign Application Priority Data

Jun. 28, 2023    (SE) ..................................... 2350797-3

(51) Int. Cl.
B60T 8/17          (2006.01)
B60T 7/04          (2006.01)
                (Continued)

(52) U.S. Cl.
CPC .............. B60T 8/172 (2013.01); B60T 8/171 (2013.01); B60T 7/042 (2013.01); B60T 2210/10 (2013.01);
                (Continued)

(58) Field of Classification Search
CPC .......... B60T 8/171; B60T 8/172; B60T 8/176; B60T 8/1766; B60T 2210/10;
                (Continued)

(56) References Cited

U.S. PATENT DOCUMENTS 9,246,417 B1 * 1/2016 Connolly .................. H02P 3/14
9,702,304 B1   7/2017 Gaither et al.
                (Continued)

FOREIGN PATENT DOCUMENTS

CN        107554505 B    5/2021
DE        19843580 A1    3/2000
                (Continued)

OTHER PUBLICATIONS

Scania CV AB, Swedish Patent Application No. 2350797-3, Office Action, Feb. 7, 2024.

(Continued)

*Primary Examiner* — Hai H Huynh
*Assistant Examiner* — Johnny H Hoang
(74) *Attorney, Agent, or Firm* — Moore & Van Allen PLLC; W. Kevin Ransom

(57) ABSTRACT

The present invention relates to a method performed by a control arrangement for controlling braking of a vehicle comprising: a service brake system and at least one auxiliary brake system for applying a brake torque to at least driven wheels of the vehicle, driver maneuverable means for requesting brake torque from the service brake system, the method comprising, when a brake torque is requested by the driver, and when a temperature of a friction brake of the service brake system increases, or is expected to increase: reducing brake torque applied by the service brake system, and increasing brake torque applied by the at least one auxiliary brake system such that the total resulting brake torque corresponds to the driver requested brake torque. The invention also relates to a control arrangement, a computer program, a computer-readable medium and a vehicle comprising a control arrangement.

20 Claims, 7 Drawing Sheets

(51) Int. Cl.
    *B60T 8/171*          (2006.01)
    *B60T 8/172*          (2006.01)

(52) U.S. Cl.
    CPC ....... *B60T 2210/20* (2013.01); *B60T 2220/02*
         (2013.01); *B60T 2220/04* (2013.01)

(58) Field of Classification Search
    CPC ............. B60T 2210/20; B60T 2220/02; B60T
         2220/04; B60T 7/042; B60W 10/04;
         B60W 10/184; B60W 10/196; B60W
         2300/17; Y02T 10/72
    USPC ...................................................... 701/47–81
    See application file for complete search history.

(56)          References Cited

U.S. PATENT DOCUMENTS

| | | | | |
|---|---|---|---|---|
| 10,392,018 | B1 * | 8/2019 | Rhodes | ................... B60L 58/25 |
| 10,723,229 | B1 * | 7/2020 | Yao | ........................... B60L 7/10 |
| 2006/0113833 | A1 | 6/2006 | Lingman et al. | |
| 2007/0013228 | A1 | 1/2007 | Lingman | |

| | | | | |
|---|---|---|---|---|
| 2015/0149055 | A1 | 5/2015 | Newberry et al. | |
| 2016/0257297 | A1 * | 9/2016 | Oshiumi | ................. B60L 58/15 |
| 2020/0122728 | A1 * | 4/2020 | Murase | ..................... B60L 7/18 |
| 2020/0324744 | A1 * | 10/2020 | Mizusaki | ............. B60T 13/686 |
| 2022/0144228 | A1 | 5/2022 | Leiter | |

FOREIGN PATENT DOCUMENTS

| | | | |
|---|---|---|---|
| DE | 102011101773 | A1 | 11/2012 |
| SE | 529955 | C2 | 1/2008 |
| SE | 1450705 | A1 | 5/2015 |
| SE | 1950479 | A1 | 10/2020 |
| WO | 2004048172 | A1 | 6/2004 |
| WO | 2007139494 | A1 | 12/2007 |
| WO | 2022253527 | A1 | 12/2022 |

OTHER PUBLICATIONS

Scania CV AB, Swedish Patent Application No. 2350797-3, Office Action, Feb. 11, 2025.
Scania CV AB, Swedish Patent Application No. 2350797-3, Office Action, Oct. 1, 2025.

* cited by examiner

200

METHOD AND CONTROL ARRANGEMENT FOR CONTROLLING BRAKING OF A VEHICLE

CROSS-REFERENCE TO RELATED APPLICATIONS

This application claims priority to Swedish Patent Application No. 2350797-3 filed Jun. 28, 2023, of the same title; the contents of which are hereby incorporated by reference.

FIELD OF THE INVENTION

The invention relates to a method and a control arrangement for controlling braking of a vehicle. The invention also relates to a computer program, a computer-readable medium and a vehicle comprising a control arrangement.

BACKGROUND

The following background description does not necessarily constitute prior art.

Vehicles in general and heavy vehicles, such as trucks and buses, in particular may be affected by gravity when travelling downhill in such a way that the vehicle speed may increase in case a brake torque is not applied. A driver of the vehicle may therefore utilize a brake system, such as a service brake system, to control the vehicle speed when going downhill. With regard in particular to heavy vehicles, there is a risk of overheating service brake systems, and for this reason heavy vehicles are in general equipped with auxiliary brake systems. Such auxiliary brakes may, e.g., comprise one or more from engine brake, exhaust brake, electromagnetic retarder and hydraulic retarder.

Auxiliary brakes are useful in particular for moderate deceleration, and for maintaining the vehicle speed constant during downhill cruise control. The use of such systems has the advantage that service brakes, i.e. the ordinary wheel brakes, may be relieved from over excessive use to prevent the service brakes from being unnecessarily worn and overheated.

Activation of the various brake systems may be configured to be controlled by a vehicle control system, and also by a driver by maneuvering driver maneuverable means, such as a brake pedal and other means, such as, e.g., a lever or a knob.

SUMMARY

It is an object of the invention to provide a method and a control arrangement for mitigating or solving drawbacks of conventional solutions. In particular, an object of the invention is to provide a method performed by a control arrangement for controlling use of the service brakes in a situation where the brake torque from the service brake system is requested by the driver.

According to a first aspect of the invention, the aforementioned and further objects are achieved through a method performed by a control arrangement for controlling braking of a vehicle, the vehicle comprising:

a. a service brake system comprising friction brakes for applying a brake torque to at least non-driven wheels of the vehicle, b. at least one auxiliary brake system for applying a brake torque to at least driven wheels of the vehicle, C. driver maneuverable means for requesting a brake torque to be applied by the service brake system, d. the method comprising, when a first brake torque is requested by a driver by means of the driver maneuverable means, and when a temperature of a friction brake of the service brake system increases, or is expected to increase, to a first temperature:

reducing a brake torque applied by the service brake system, and increasing a brake torque applied by the at least one auxiliary brake system such that the total resulting brake torque corresponds to the requested first brake torque.

As was mentioned above, heavy vehicles are in general designed with a service brake system, i.e., the ordinary wheel friction brakes, and at least one auxiliary brake system. The service brake system, the service brakes, may act on all wheels of the vehicle, and in particular not only on driven wheels but also provide brake torque to non-driven wheels. The service brake system is a friction brake system where the brake torque is provided by friction, e.g., through a disc brake where brake pads press against a brake disc, or through a drum brake where brake shoes act on the inside of a rotating drum, to provide the desired friction and thereby friction brake force.

With regard to auxiliary brake systems, on the other hand, these act on driven wheels, where, as mentioned above, such systems may, inter alia, comprise engine brake, exhaust brake, electromagnetic and/or hydraulic retarder.

When a heavy vehicle is travelling downhill, there is a risk that the friction brakes of the service brake system may become overheated in case the service brake system is applied for extended periods of time. This, in turn, may lead to a situation where insufficient brake torque is available for safely braking the vehicle. For this reason, one or more auxiliary brake systems may be applied instead of, or in addition to, the friction brakes, to thereby reduce the work produced by the friction brakes. In case the vehicle is being driven with an activated cruise control function, the selection of brakes may be controlled entirely by the vehicle control system, and thereby in such a manner that most or all of the required brake torque is provided by one or more auxiliary brake systems.

On the other hand, in situations where the driver is manually controlling vehicle speed, and vehicle braking when going downhill, the selection of brake system is more in the hands of the driver. It has been realized that some drivers tend to reduce use of auxiliary brakes in favor of use of friction brakes to a considerably higher extent than was perhaps assumed beforehand, and which thereby may result in an undesired overheating of the service brake system.

According to the invention, it is provided a method for reducing the negative impact of such wrongful use of the vehicle brakes.

According to the first aspect of the invention, the method is carried out when a first brake torque is requested by a driver by means of the driver maneuverable means, such as a brake pedal or other driver means, for controlling the service brakes, and when a temperature of the service brake system increases, or is expected to increase, to a first temperature. In situations of this kind, brake torque that is applied by the service brake system is reduced, and the reduction in reduced brake torque is compensated for by an increase of a brake torque applied by the at least one auxiliary brake system such that the total resulting brake torque corresponds to the requested first brake torque.

In this way, the vehicle will maintain the behavior in terms of deceleration or maintaining speed as requested and expected by the driver, but where the service brake system is alleviated from excessive wear also in situations where the driver actively requests a service brake torque that causes the service brakes to overheat, or to be expected to overheat. The temperature may be determined, e.g., using temperature sensors or through estimation, and may be determined as the temperature of the wheel exhibiting the highest temperature, or, e.g., as an average temperature of two or more wheels.

According to aspects of the invention, the method by the comprises, when the first brake torque is requested: applying a part of the requested first brake torque by means of the at least one auxiliary brake system, and the remainder by the service brake system, and increasing the part of the first brake torque applied by means of the at least one auxiliary brake system when the temperature of the friction brake of the service brake system increases, or is expected to increase, to the first temperature.

It is to be understood that in a general case there may always be some auxiliary brake torque applied by an auxiliary brake system also when the driver brakes the vehicle, e.g., through engine braking, but according to the invention auxiliary brake system torque in such situations is increased to a higher torque than is requested by the driver.

That is, even though in reality the driver only requests brake torque from the service brake system, the vehicle control system may be configured such that part of the brake torque that is applied to obtain the desired deceleration or maintaining of speed of the vehicle is still provided by one or more auxiliary brake systems. It is to be understood that the majority of the brake torque is still provided by the service brakes. According to aspects of the invention, the part of the driver requested brake torque that is applied by one or more auxiliary brake systems is hence increased in dependence of the temperature of the service brake system.

According to aspects of the invention, part of the brake torque requested by the driver by means of the driver maneuverable means, may, as stated, be applied by one or more of the at least one auxiliary brake system, where the maximum available brake torque to be applied by the at least one auxiliary brake system is limited to a first torque limit. This auxiliary brake torque limit may be increased to a second, higher, torque limit when the temperature of a friction brake of the service brake system increases, or is expected to increase, to a first temperature. In this way, the vehicle will still behave substantially according to the desires of the driver although part of the brake torque is provided by at least one exterior brake system, but where this this increased in dependence of the temperature of the service brake system.

This may also be utilized in the configuration of the vehicle control system. For example, the vehicle may comprise a brake system control unit that determines a brake torque to be applied by one or more of the vehicle brake systems, where the brake torque to be applied may be received, e.g., through a request from a driver through driver maneuverable means or, e.g., from other vehicle systems, such as a cruise control system. The brake system control unit may be designed such that auxiliary brake torque is applied by preference, and if no restrictions apply this could mean that even though the driver requests a service brake torque, the brake system control unit requests all the brake torque from exceeding the brake systems.

However, in order to provide a system where the vehicle still behaves according to the driver preferences, another part of the vehicle control system may impose restrictions regarding the amount of brake torque that the brake system control unit is actually allowed to apply. According to aspects of the invention, this limit is increased in dependence of the temperature of the service brake system, with the result that the brake system control unit may apply more torque through auxiliary brake systems than otherwise would be possible.

According to aspects of the invention, the increase of the part of the first brake torque that is applied by means of the at least one auxiliary brake system is based on the extent to which the temperature of the friction brake of the service brake exceeds the first temperature, and/or a rate of change of the temperature of a friction brake of the service brake system. For example, the service brake system may be decreased more when the service brake temperature increases rapidly than when the service brake system increases more slowly.

According to aspects of the invention, the brake torque applied by the at least one auxiliary brake system is increased by a first increase when the temperature of a friction brake of the service brake system increases to the first temperature, and to a second, higher, increase when the temperature of the friction brake of the service brake system increases to a second, higher than the first, temperature. In this way the service brake torque can be, e.g., reduced when a temperature limit is reached, but where the temperature still continues to increase. This may be sufficient to prevent the temperature from reaching a too high temperature before the end of the downhill is reached, while still maintaining driver comfortability. However, in case a higher temperature limit is reached, the service brake torque can be reduced further, and the auxiliary brake torque can be increased further. Various limits may be utilized, and also a substantially continuous increase and decrease in dependence of the temperature increase may be utilized.

According to aspects of the invention, the first temperature at which the brake torque applied by the at least one auxiliary brake system is increased when data relating to the upcoming road in front of vehicle indicates a reduced need for brake torque. In this way, a higher temperature of the service brake system may be tolerated in situations where the road is about to level out, or even transition to an uphill stretch or road, since it can be assumed that the request for brake torque is about to reduce or cease altogether, and the temperature thereby start to reduce to lower levels.

According to aspects of the invention the brake torque applied by the at least one auxiliary brake system is increased when it is estimated that the temperature of a friction brake of the service brake system will exceed the first temperature within a first period of time. In this way precautionary measures can be taken prior to the first temperature is actually reached to thereby reduce the risk of overheating, and also reduce temperature dependent wear that the service brake system is subjected to.

The estimation of the temperature of the service brake system may be at least partly based on information related to the inclination of the upcoming road in front of the vehicle. Consequently, e.g., map data comprising road inclination may be utilized to determine the evolvement of the temperature of the service brake system as the vehicle moves forward.

The estimation of the temperature of the service brake system may further be at least partly based on a current driver behavior, wherein it may be assumed that the driver maintains a current behavior during a period of time for which the temperature is estimated. The assumption that the driver maintains a current request for torque during the time for which the temperature is estimated may provide an estimation with a high degree of accuracy. It is also contemplated that the time interval for which the estimation is made may be limited, e.g., to a predetermined number of seconds, and hence a limited period of time. Still the estimation can be configured to be continuously carried out.

The driver maneuverable means may comprise a brake pedal, wherein the driver requests brake torque by depressing the brake pedal.

According to aspects of the invention, the temperature of the service brake system is an estimated temperature, and/or a temperature obtained through the use of a temperature sensor. The temperature may hence be determined in various different ways.

According to a further aspect, the invention relates to a control arrangement for braking a vehicle, where the control arrangement is configured to, when a first brake torque is requested by a driver by means of the driver maneuverable means, and when a temperature of a friction brake of the service brake system increases, or is expected to increase, to a first temperature: reduce a brake torque applied by the service brake system, and increase a brake torque applied by the at least one auxiliary brake system such that the total resulting brake torque corresponds to the requested first brake torque.

It will be appreciated that all that has been described for the method aspects of the invention is applicable also to control arrangement aspects of the invention. Thus, all the aspects described for methods according to the invention may be performed by the control arrangement, which may also be a control device, i.e., a device. The control arrangement and its embodiments have advantages corresponding to the advantages discussed above with regard to the various aspects of methods according to the invention.

According to another aspect of the invention, aforementioned and further objectives are achieved through a vehicle comprising a control arrangement according to aspects of the invention.

According to a further aspect, the invention relates to a computer program comprising instructions which, when the program is executed by a computer, cause the computer to carry out the method according to aspects of the invention.

According to an aspect, the invention relates to a computer-readable medium comprising instructions which, when executed by a computer, cause the computer to carry out the method according to aspects of the invention.

Further advantageous aspects of the method, the control arrangement, the vehicle, the computer program, and the computer-readable medium according to the invention will emerge from the detailed description.

BRIEF DESCRIPTION OF THE DRAWINGS

Aspects of the invention will be illustrated in more detail below, along with the enclosed drawings, where similar references are used for similar parts, and where.

6

Figure 6:
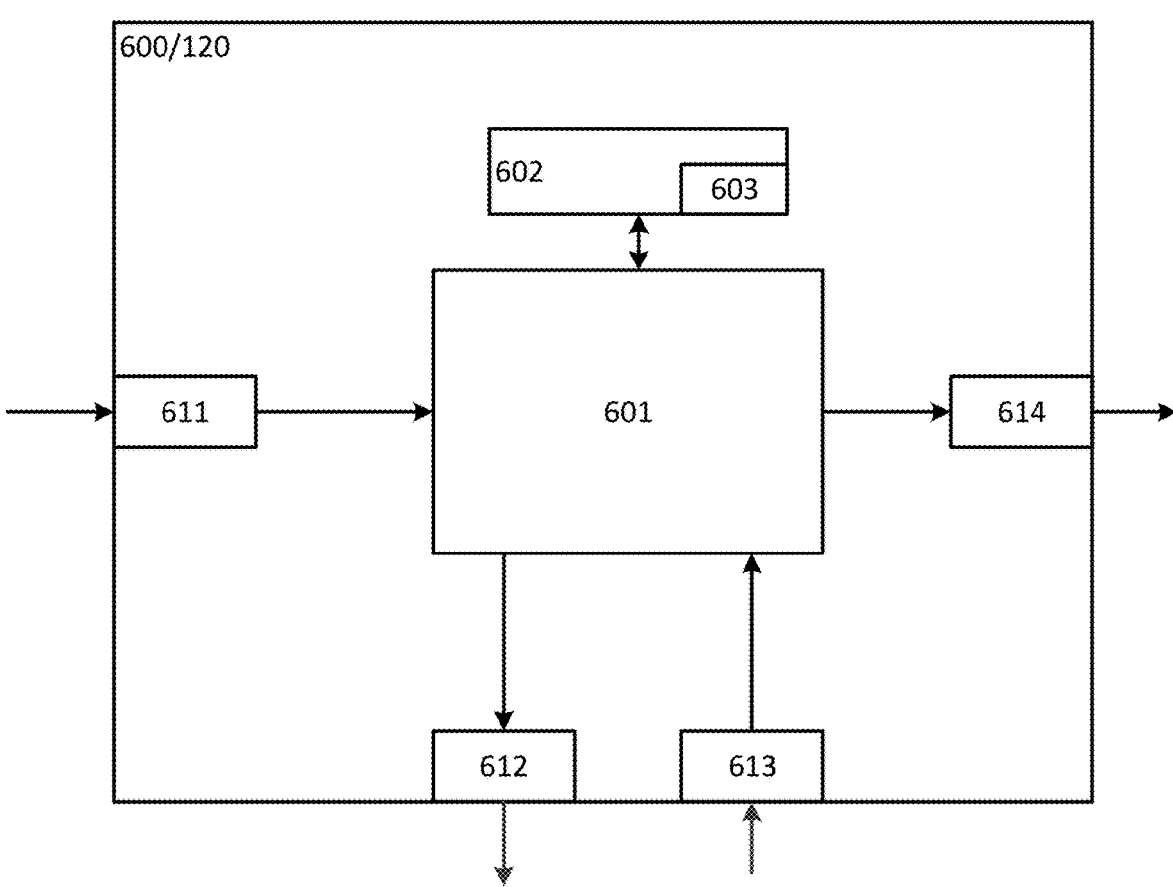

FIG. 6 shows a control arrangement, in which a method according to any one of the aspects described herein may be implemented.

DETAILED DESCRIPTION

Figure 1:
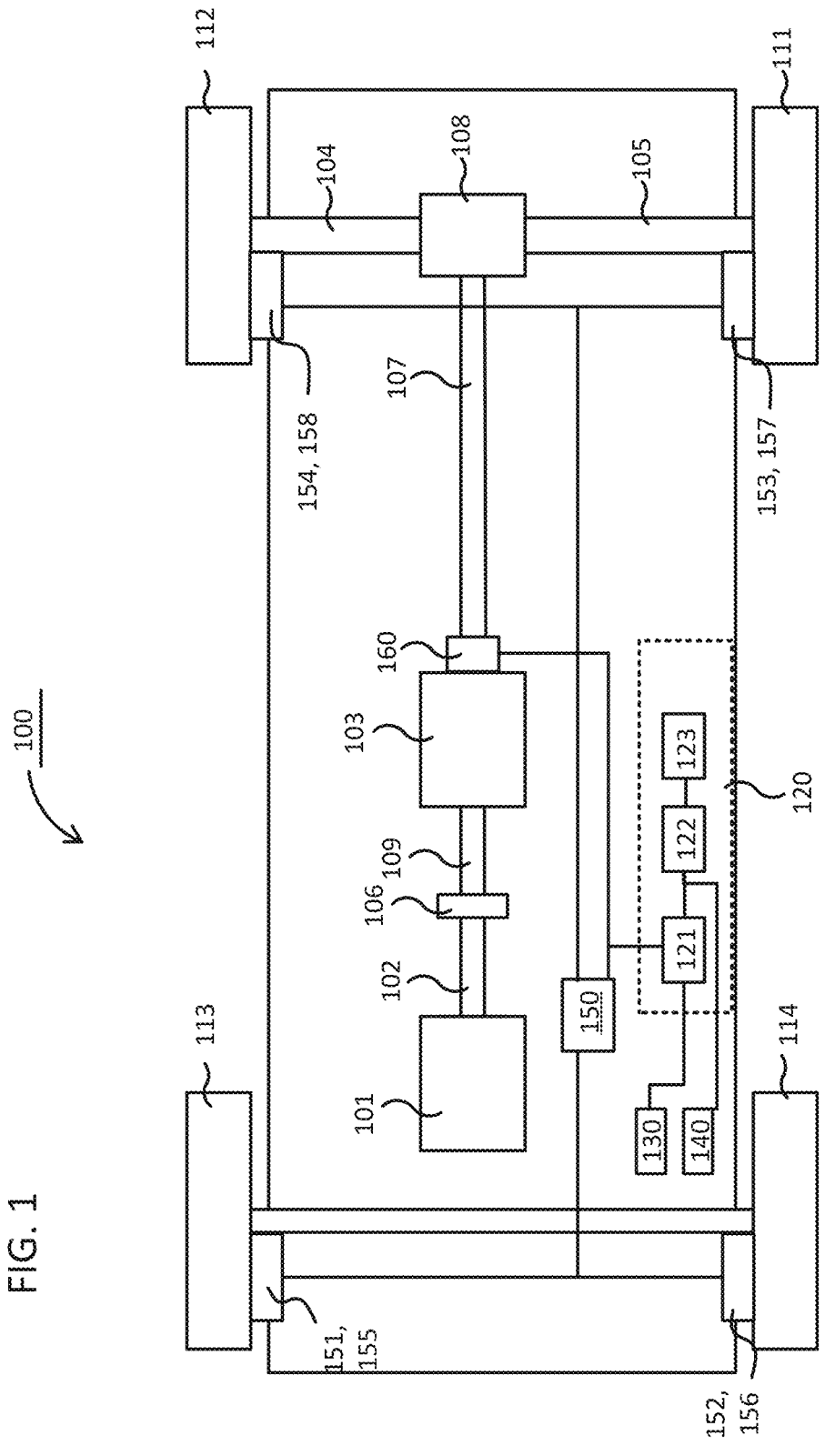
FIG. 1 shows a schematic view illustrating an exemplary vehicle in which aspects of the invention may be implemented.

FIG. 1 schematically shows an exemplary heavy vehicle 100, such a truck or a bus, which will be used to explain aspects according to the invention. The invention, however, is not limited for use in vehicles as the one illustrated in FIG. 1, but may also be used in any vehicle comprising a service brake system and at least one auxiliary brake system.

The vehicle 100, as schematically illustrated in FIG. 1, comprises a pair of drive (i.e. driven) wheels 111, 112 and at least one other pair of non-driven wheels 113, 114. The vehicle 100 furthermore comprises a drivetrain configured to transfer torque between at least one power source 101, and the drive wheels 111, 112. The at least one power source 101 may comprise a combustion engine, at least one electrical machine, or any combination thereof. According to the present example, the power source 101 is an internal combustion engine.

The internal combustion engine 101 is, in a manner known per se, connected to a gearbox 103 via an output shaft 102 of the engine 101, and a clutch 106. The torque provided by the internal combustion engine 101 is provided to an input shaft 109 of the gearbox 103. A propeller shaft 107, connected to an output shaft of the gearbox 103, propels the drive wheels 111, 112 via a central gear 108, such as, e.g., a differential gear, and drive shafts 104, 105.

The vehicle 100 also comprises a, e.g., hydraulic, service brake system 150 constituting a friction brake system and comprising brake discs, or drums, 151, 152, 153, 154, with associated brake linings, or brake shoes, 155, 156, 157, 158 acting on the discs, or drums, to provide a brake torque through friction. According to the illustrated example, brake discs/drums are arranged at each one of the wheels of the vehicle 100 as is usually the case.

The linings/shoes are pressed against the discs/drums, e.g., through influence of a hydraulic pressure, when the vehicle 100 is to be subjected to a brake torque. The hydraulic pressure, or brake pressure, is controlled by a control arrangement 120 forming part of vehicle control system, and according to the present non-limiting example through an electronic brake system (EBS) control unit 121. The EBS 121 may be configured to control the brake pressure of the service brake system based, inter alia, on received requests for brake torque. Such requests may, for example, constitute driver requests, where the driver may request a brake torque through driver maneuverable means such as a brake pedal 130. The EBS 121 may also receive brake requests through other means, such as, for example, a cruise control system of the vehicle.

The vehicle 100 furthermore comprises at least one auxiliary brake system, where such auxiliary brake systems may comprise, e.g., an exhaust brake system and/or, as in the present case, a retarder brake system 160 that applies brake torque to the gearbox output shaft and/or propeller shaft 107. Retarder brake systems are very common and may, e.g., be of an electric or hydraulic type. The vehicle 100 may also be configured to provide auxiliary brake torque through an increase of engine brake torque by changing gear in the gearbox 103 to increase the speed of rotation of the ice 101 to thereby increase internal losses of the ICE 101.

The drivetrain, including the ICE 101, clutch 106 and gearbox 103, as well as other components of the powertrain, may be controlled by a control unit 123 in a vehicle control system via a control arrangement 120 comprising control units 121, 122, 123. The control arrangement 120 may, as is known per se, be distributed over a plurality of control units configured to control different parts of the vehicle 100, and a vehicle may hence comprise a substantial amount of control units and also control arrangements. The control arrangement 120 and/or any other suitable control arrangement, may further be configured to control any other units/devices/entities of the vehicle 100. The illustration of FIG. 1 is hence only exemplary, and various other configurations exist. The control arrangement 120 will be described more in detail with reference to FIG. 7 below.

The vehicle 100 may also comprise a positioning system/unit 140. The positioning unit 140 may be based on a satellite navigation system such as the Navigation Signal Timing and Ranging (Navstar), Global Positioning System (GPS), Differential GPS (DGPS), Galileo, GLONASS, or the like. Thus, the positioning unit 140 may comprise a GPS receiver. The positioning system 140 may be utilized to determine prevailing and upcoming driving conditions of the vehicle.

It should also be understood that the powertrain of the vehicle 100 may be of various other different designs than the one illustrated in FIG. 1 without departing from the scope of the invention, for as long as the vehicle comprises a service brake system and at least one auxiliary brake system.

As has been mentioned above, aspects of the invention provide a method for controlling braking of a vehicle in a situation where the vehicle is in motion. As was also mentioned, heavy vehicles, such as the vehicle 100 according to the illustrated example, in general comprises one or more auxiliary brake systems. This is because a conventional service brake system, as is oftentimes used as the primary and only brake system for use during driving in lighter vehicles, may not always provide a sufficient brake torque. This relates in particular to traveling downhill for extended periods of time with applied service brakes, which may cause the service brakes to overheat and thereby loose brake capability. Therefore, in order to alleviate the use of the service brakes, brake torque may instead partly or fully be applied through the use of one or more auxiliary brake systems. Such auxiliary brake systems may, e.g., be driver activated through driver maneuverable means such as a knob, a lever, etc. The activation of auxiliary brake systems may also be controlled through the vehicle control system, where the vehicle control system may also determine the amount of torque to be applied by the one or more auxiliary brake systems. For example, the vehicle control system may fully determine the use of, and distribution between, the various brake systems when the vehicle being driven under the influence of a cruise control system.

However, when the vehicle is being manually driven, i.e., with cruise control functions deactivated, the driver may be in considerably more control of the actual use of the various brake systems. It is in general the intention of the vehicle manufacturer that a driver, e.g., when driving downhill for an extended period of time, as much as possible uses the auxiliary brake systems to minimize service brake usage. However, it has been noted that some drivers, for various reasons, tend to prioritize use of the service brake system over use of the auxiliary brake systems. There may be various reasons for this. For example, the auxiliary brake systems may exhibit drawbacks in particular with regard to driver comfortability.

If the vehicle is being driven downhill on a higher gear using only the service brake system to provide the required brake torque, driver comfortability may be perceived as high because of relatively low noise levels prevailing in the cabin. On the other hand, in case the brake torque, instead, is provided through the one or more auxiliary brake systems noise levels in the cabin may be considerably higher. For example, the gearbox may be controlled to downshift one or more steps to increase the speed of rotation of the ICE in order increase engine brake torque with increased noise levels as result. Similarly, use of a retarder brake system and/or exhaust brake system will also result in increased noise levels. In view of this, as stated, there are drivers that tend to use the service brake system for comfortability reasons.

Figure 2A:
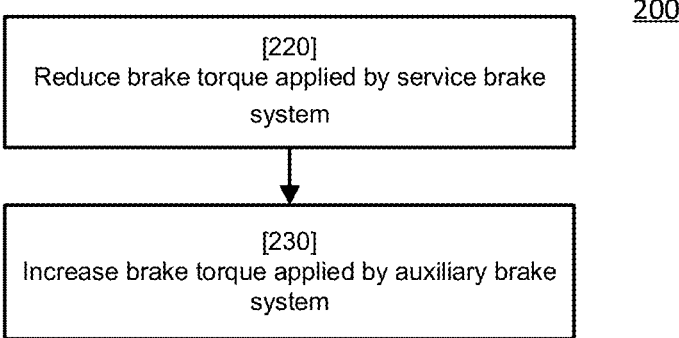
FIG. 2A shows a flow chart illustrating a method according to aspects of the invention.

According to the invention it is provided a method for alleviating drawbacks of extensive driver use of the service brake system, and aspects of the invention will now be described with reference to a method 200, schematically illustrated in FIG. 2A. The method 200 may be carried out by any one or more suitable control arrangements of the vehicle, such as the control arrangement 120.

The method comprises, when a first brake torque is requested by a driver by means of the driver maneuverable means, such as the brake pedal 130, and when a temperature of the service brake system 150 increases, or is expected to increase, to a predetermined temperature: reduce the brake torque that has been requested by the driver and at least partially has been applied by the service brake system 150, step 220, and, to compensate for the reduction of the service brake torque, increase the brake torque applied by the at least one auxiliary brake system 160 such that the total resulting brake torque corresponds to the requested first brake torque, step 230.

In this way, the driver may utilize the service brake system 150 according to the preferences of the driver for as long as the service brake system 150 does not become, or is at risk to become, overheated. On the other hand, if the service brake system 150 becomes overheated, or there is a risk that the service brake system 150 may become overheated, the brake torque applied by the service brake system 150 is reduced and instead compensated for by an increase of auxiliary brake torque with a possible decrease in driver comfortability as result. The invention hence allows driver behavior of utilizing the service brake system 150 for as long as this may not pose a risk for the overall safety of the vehicle. It is to be understood that the method steps 220-230 need not be performed consecutively, but may be commenced in any suitable order, and be carried out partly or fully simultaneously, for as long as the resulting brake torque as a result of the method steps correspond to the overall request for brake torque.

Aspects of the invention will be explained more in the detailed with reference to FIG. 2B and FIGS. 3-5.

Figure 2B:
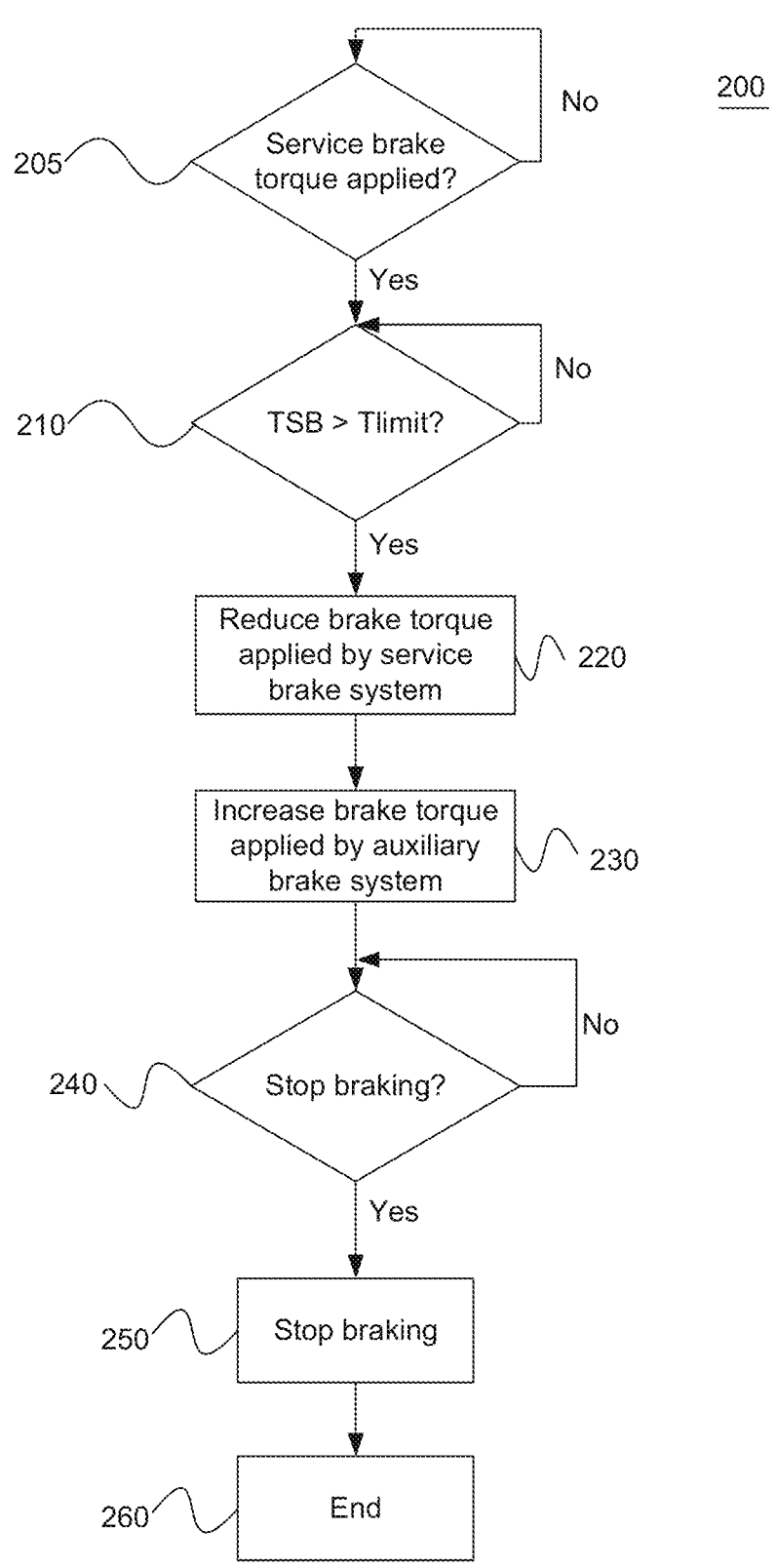
FIG. 2B shows a flow chart illustrating methods according to further aspects of the invention.

FIG. 2B illustrates an exemplary method 200 according to aspects of the invention. The method 200 starts in step 205, where it is determined whether a service brake torque is applied. The method remains in step 205 for as long as this is not the case whereas, when it is determined that torque is requested from the service brake system 150, the method continues to step 210. In step 210 it is determined whether a temperature of the service brake system 150 exceeds, or is expected to exceed, a temperature limit $T_{lim}$. This temperature limit, $T_{lim}$, may, for example, constitute a temperature measurement or an estimation of the brake discs/drums, where the temperature determination may relate to the highest temperature that currently has been reached at any of the wheels of the vehicle that has been taken into account, or an average temperature taking the service brakes of two or more or all wheels into account. The temperature may be determined directly through the use of suitable sensors, or be estimated through the use of, e.g., a mathematical model representation of the brake system and vehicle, taking, e.g., vehicle load into account. When it is determined that the service brake system temperature exceeds or is expected to exceed, the temperature limit, the method continues to step 220 reduce the torque applied by the service brake system 150.

Figure 3:
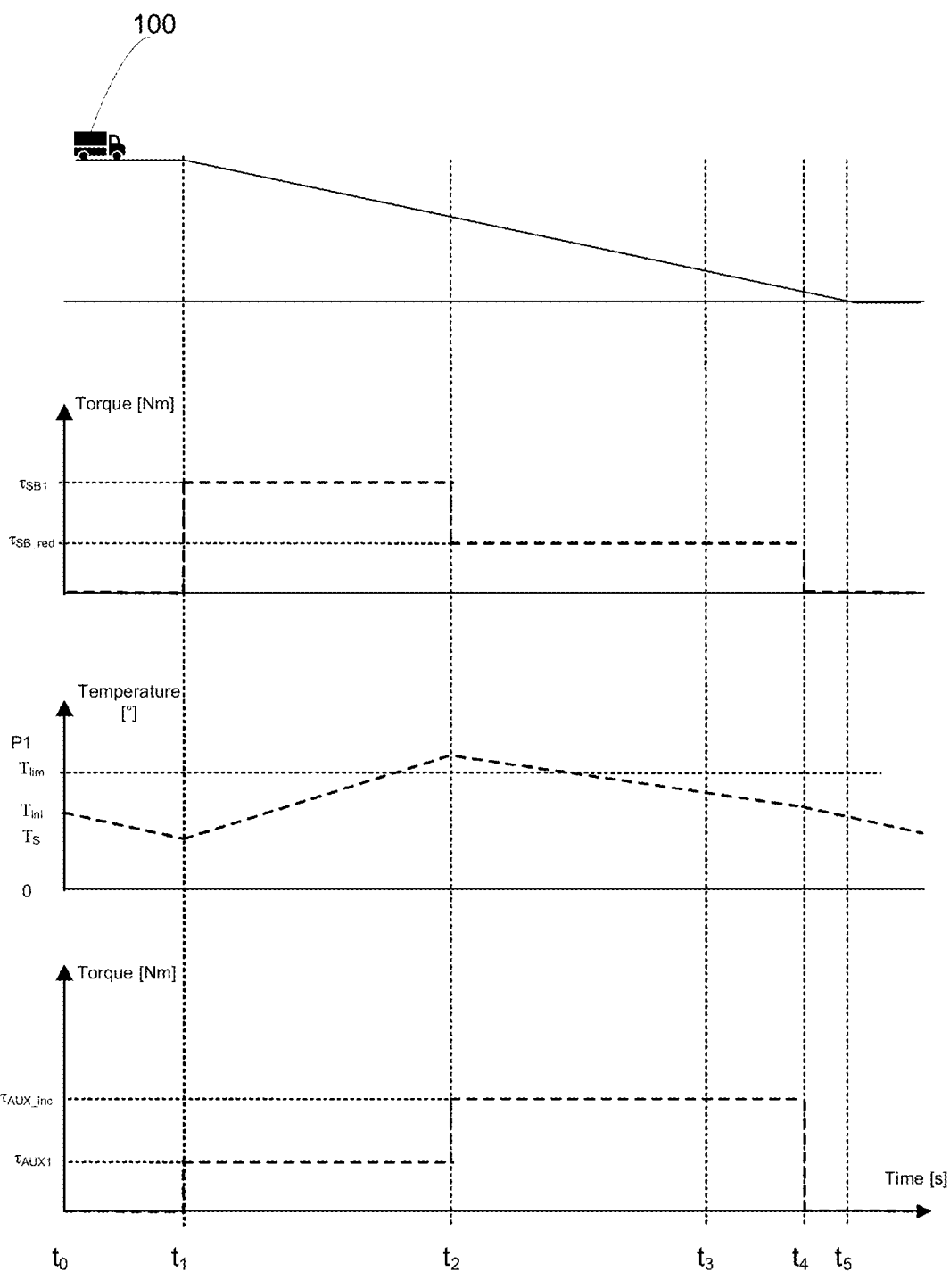
FIG. 3 illustrates braking of a vehicle when travelling downhill according to aspects of the invention.

This is illustrated in FIG. 3. FIG. 3 illustrates four graphs, where the uppermost graph schematically illustrates the inclination on the road upon which the vehicle 100 is traveling. According to the present example, the vehicle travels on a level stretch of road between the time $t_0$ and times $t_1$ whereas the road transitions to a downhill stretch of road between times $t_1$ and times $t_5$ where the road gradient levels out. The second graph from above illustrates the torque $\tau_{SB}$ applied by the service brake system 150. The third graph from above illustrates the temperature T of the service brake system 150, and the lowermost graph illustrates the torque $\tau_{AUX}$ applied by the one or more auxiliary brake systems of the vehicle 100.

According to the present example, no brake torque is applied for as long as the vehicle is traveling on level road. When the vehicle reaches the downhill, at time $t_1$, the driver requests a brake torque using the brake pedal 130 and a torque $\tau_{SB1}$ is applied. It is to be noted in this regard that although the driver requests brake torque from only the service brake system, the vehicle control system may still be configured such that part of the brake torque is applied using one or more auxiliary brake systems. For example, some brake torque may be provided by engine braking at a current gear, and it is also possible that some further brake torque is applied through one or more further auxiliary brake systems. According to embodiments of the invention, the EBS control unit 121 may be configured to attempt to apply as much auxiliary brake power as possible, but where a higher level control unit, such as control unit 122 in FIG. 1 may control the levels that the EBS 121 can actually apply in each instance, such as the levels illustrated in the figures below.

This is also the case according to the present example, and this is illustrated in FIG. 3 by brake torque $\tau_{AUX1}$ being applied at the same time as the service brake torque $\tau_{SB2}$ is applied. The total brake torque acting on the vehicle is hence the sum of the brake torques $\tau_{SB1}$ and $\tau_{AUX1}$. According to aspects of the invention no auxiliary brake torque is applied at this point in time, but a higher brake torque from the service brake system is applied instead.

As can be further seen from FIG. 3, the temperature of the service brake system 150 has a currently prevailing temperature $T_{ini}$ at time $t_0$. This temperature $T_{ini}$ may be essentially any temperature, and will depend on the driving situations that the vehicle has been subjected to during the driving up to the time $t_0$. That is, the temperature will depend on, e.g., whether the vehicle recently has been driven downhill, or on level road etc. As can be further seen from the Figure, since no brake torque is applied between times $t_0$ and $t_1$ the service brake system 150 temperature is decreasing and has fallen to a temperature $T_S$ at time $t_1$. At time $t_1$ brake torques are applied according to the above. As a result the service brake system temperature starts to increase, and continues to increase between times $t_1$ and $t_2$ where, at time $t_2$ the service brake system temperature has exceeded a temperature limit $T_{lim}$ at which it is considered that the service brake system 150 is subjected to excess temperatures and actions need to be taken.

The method of FIG. 2B therefore continues to step 220, where a decrease of the service brake is carried out while simultaneously a corresponding increase in the auxiliary brake torque is also carried out. The service brake torque is reduced to a brake torque $\tau_{SB\_red}$ and the auxiliary brake torque is increased by a corresponding increase to an auxiliary brake torque level $\tau_{AUX\_inc}$ to compensate for the reduction in service brake torque to allow the vehicle 100 to continue with the same overall brake torque acting on the vehicle wheels. According to FIG. 3 this increase and decrease, respectively, is illustrated as being carried out essentially instantly, but may also be configured to be carried out over a period of time according to embodiments of the invention.

Furthermore, the amount to which the auxiliary brake torque is increased, and the service brake torque is decreased, in this instance may depend on various factors, such as the amount to which the temperature of the service brake system exceeds the temperature limit when the change in applied torque is carried out, where the auxiliary brake torque may be increased more when the temperature is higher. The increase of the rate of change of the temperature may also be utilized in this determination, where, similarly, the auxiliary brake torque may be increased more for higher rates of change of the temperature since a larger decrease in the torque applied by the service brake system may be required to stop the temperature increase.

According to the illustrated example, the decrease in service brake system torque stops the ongoing temperature increase, and following the reduction of applied service brake torque the temperature also starts to decrease and fall below the temperature limit $T_{lim}$. According to the present example the reduction in service brake torque is maintained throughout the remaining travel in the downhill, and hence for as long as a brake torque is still applied. When it is determined that braking is no longer required, step 240, e.g. because the vehicle is reaching the end of the downhill, braking is stopped, step 250 and the method is ended, step 260. According to the present example braking is stopped at time $t_4$, i.e., slightly before the end of the downhill at time $t_5$ is reached, to allow for an increase in vehicle speed prior to the road levelling out to benefit from the acceleration of gravity prior to the vehicle is decelerated from the upcoming road.

According to aspects of the invention, the service brake system torque may again be increased following a decrease during the downhill in case the temperature has had time to reduce to a lower temperature limit at which an increase in service brake torque may again considered to be allowed.

According to aspects of the invention, it is hence provided a method that as much as possible may allow the vehicle to be driven according to the preferences of the driver while simultaneously it is ensured that potentially harmful overheating is prevented.

Figure 4:
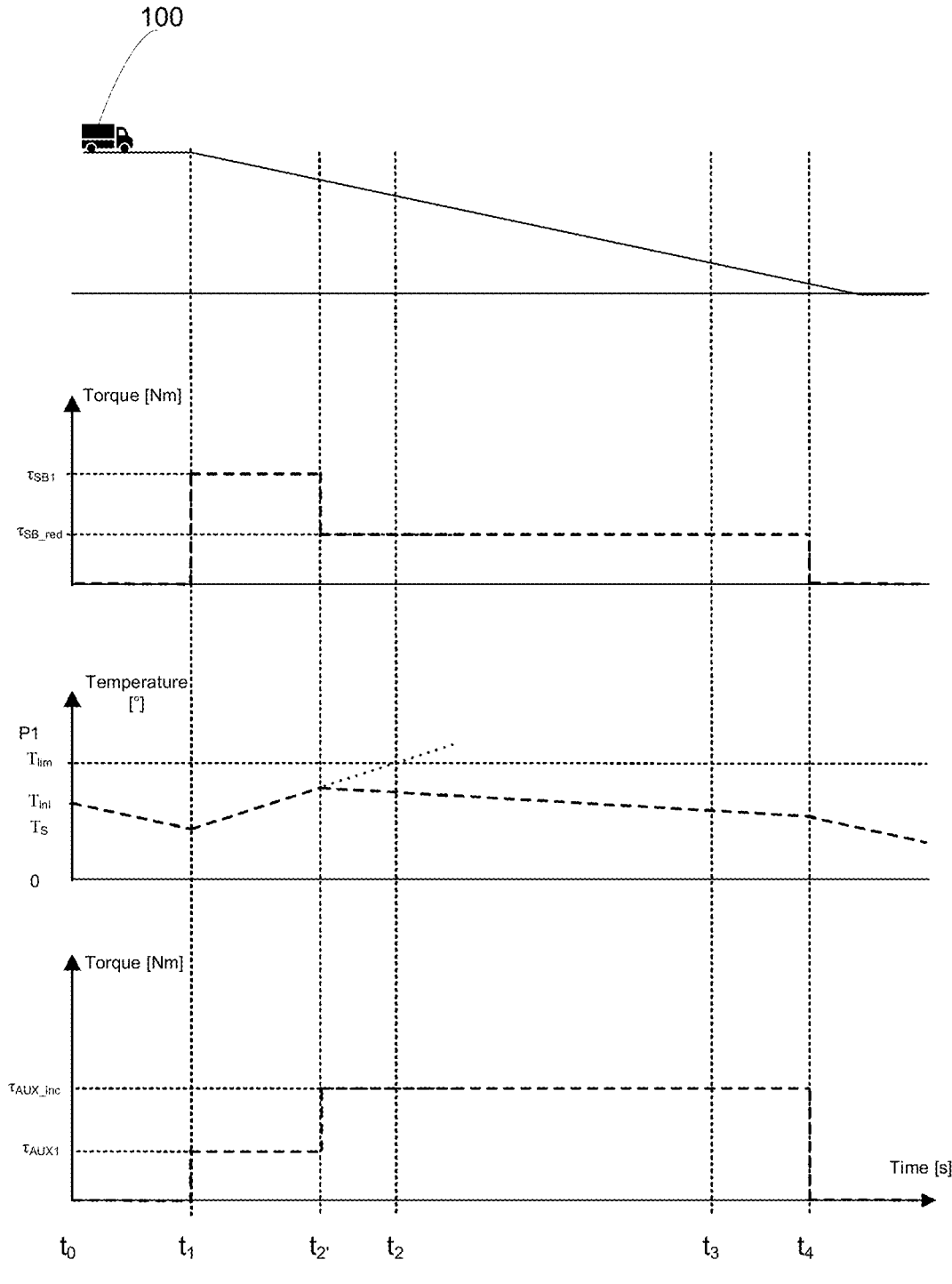
FIG. 4 illustrates braking of a vehicle when travelling downhill according to other aspects of the invention.

FIG. 4 illustrates a further exemplary aspect of the invention, which to a large extent is similar to the embodiment of FIG. 3, but where it is determined, during the downhill driving, that the service brake system temperature is expected to increase to a potentially harmful temperature $T_{lim}$ within a predetermined period of time, and actions are, instead of waiting for the temperature limit to be reached, taken prior to the temperature actually reaching the temperature limit $T_{lim}$. As was mentioned, this may be carried out through suitable estimations.

Hence, in this case, it is determined at time $t_{2'}$ that the temperature of the service brake system will reach the temperature limit $T_{lim}$ at time $t_2$ in case no actions are Therefore corresponding changes in brake torque as is applied in FIG. 3 is carried out at time $t_2$. In this case, however, the reduction is carried out at an earlier point in time to prevent the temperature from reaching the temperature limit $T_{lim}$ altogether.

The estimation as to whether the service brake system temperature will reach the temperature limit may be carried out at least partly based on information related to the inclination of the upcoming road in front of the vehicle, where, e.g., navigation system data comprising road inclination in combination with vehicle parameters such as vehicle weight may be utilized.

Furthermore, the temperature change that the service brake system 150 undergo will inherently depend at least partly on a current driver behavior, since the temperature will depend on the magnitude of the brake torque that the driver requests using the brake pedal. Therefore, the estimation can be made with the assumption that the driver maintains a current behavior during the period of time for which the temperature is estimated, which, e.g., may be for an upcoming number of seconds, e.g., in the interval 5-15 seconds.

According to further aspects of the invention, the applied brake torque may, instead, be reduced to a lesser extent than what has been illustrated, and hence a lesser increase in auxiliary brake torque be applied. This may have the result that the temperature may still continue to increase during the downhill, but at a rate at which the temperature limit is not reached, or is reached at a later stage in which case a further reduction in service brake torque may be carried out.

Figure 5:
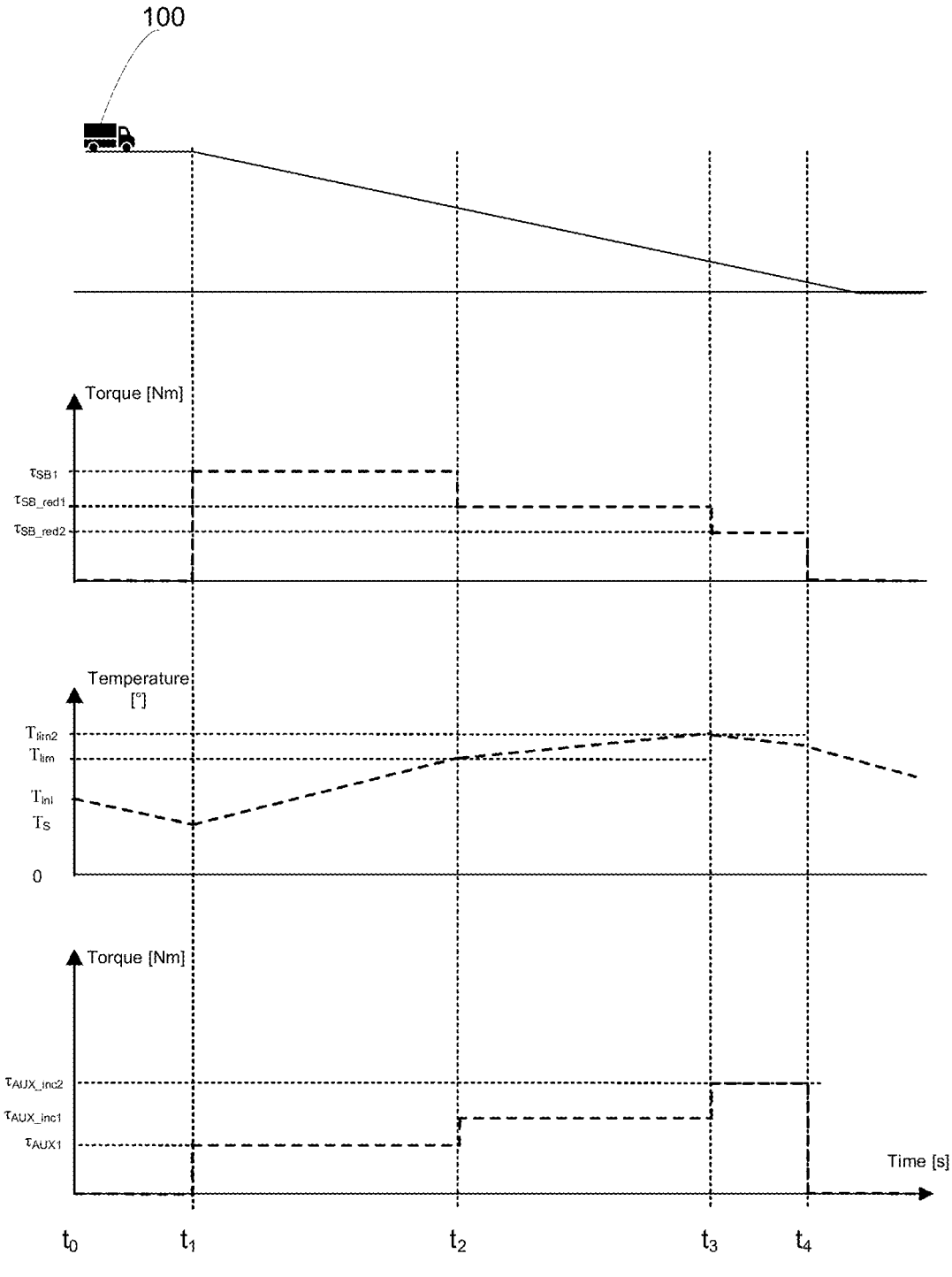
FIG. 5 illustrates braking of a vehicle when travelling downhill according to other aspects of the invention.

FIG. 5 illustrates a further example according to aspects of the invention. According to FIG. 5, which in part is similar to FIG. 3. However, at time $t_2$, when the temperature limit $T_{lim}$ is reached, the service brake torque is reduced to a lesser extent when compared to the situation in FIG. 3, and, correspondingly, the auxiliary brake torque is also increased to a lesser extent. According to the present example this has the result that the service brake temperature continues to increase, albeit at a slower rate. At time $t_3$ the temperature reaches a second temperature limit $T_{lim2}$ at which the service brake torque is further reduced, and the auxiliary brake torque is also further increased so that the increase in temperature stops. Braking is then discontinued when the vehicle 100 reaches the end of the downhill.

According to embodiments of the invention, where a temperature limit is reached, the temperature limit is in fact increased to a temperature. The reason for this may, for example, be that, e.g., a downhill is about to end and that it can therefore be expected that the driver anyway will reduce the applied brake torque with the result that the temperature anyway will start to decrease. This may hence prevent a situation where service brake torque is reduced only to be changed once again after a short period of time. The determination as to whether the temperature limit may be increased may be determined utilizing data relating to the upcoming road in front of the vehicle.

In sum, according to various aspects of the invention, it is provided methods for braking a vehicle in accordance with the preferences of the driver, while still ensuring that the service brakes do not overheat with associated undesired reductions in available brake torque as result, and which methods may also increase driver comfortability.

According to an aspect of the invention, a control arrangement 120 for controlling braking of a vehicle 100 comprising a service brake system and an auxiliary brake system.

The control arrangement 120, includes a control unit 121 arranged to, in a situation where the vehicle is in motion and a brake torque is requested by a driver using, e.g., a brake pedal, decrease the brake torque applied by the service brake system and instead increase brake torque applied by at least one auxiliary brake system. accelerate the ICE using drive wheel torque by partially closing the clutch.

The control arrangement 120, e.g. a device or a control device, according to the invention may be configured to perform all aspects that have been described with regard to methods.

Hence the control arrangement 120 is provided with the above-described advantages for the various aspects of the invention. The invention also relates to a vehicle 100 including the control arrangement 120.

FIG. 6 illustrates a control arrangement 600/120, which may be utilized to carry out the invention. The control arrangement 600/120 comprises a computing unit 601, which can be constituted by essentially any suitable type of processor or microcomputer, e.g., a circuit for digital signal processing (Digital Signal Processor, DSP), or a circuit having a predetermined specific function (Application Specific Integrated Circuit, ASIC). The computing unit 601 is connected to a memory unit 602 arranged in the control arrangement 600/120, which memory unit provides the computing unit 601 with, e.g., the stored program code and/or the stored data which the computing unit 601 requires to be able to perform computations. The computing unit 601 is also arranged to store partial or final results of computations in the memory unit 602.

In addition, the control arrangement 600/120 is provided with devices 611, 612, 613, 614 for receiving and transmitting input and output signals. These input and output signals can contain waveforms, impulses, or other attributes which, by the devices 611, 613 for the reception of input signals, can be detected as information and can be converted into signals which can be processed by the computing unit 601. These signals are then made available to the computing unit 601. The devices 612, 614 for the transmission of output signals are arranged to convert signals received from the computing unit 601 in order to create output signals by, e.g., modulating the signals, which can be transmitted to other parts of and/or systems in the vehicle 100.

Each of the connections to the devices for receiving and transmitting input and output signals can be constituted by one or more of a cable; a data bus, such as a Controller Area Network CAN bus, a Media Orientated Systems Transport MOST bus, or some other bus configuration; or by a wireless connection. A person skilled in the art will appreciate that the above-stated computer can be constituted by the computing unit 601 and that the above-stated memory can be constituted by the memory unit 602.

Control systems in modern vehicles commonly comprise communication bus systems consisting of one or more communication buses for linking a number of electronic control units, ECU's, or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1 and 7, which is well known to the person skilled in the art within this technical field.

In a shown embodiment, the invention may be implemented by the one or more above mentioned control units 121-123. The invention can also, however, be implemented wholly or partially in one or more other control units being present in the vehicle 100, or in one or more control unit dedicated to the invention.

Here and in this document, units are often described as being arranged for performing steps of the method according to the invention. This also includes that the units are designed to and/or configured to perform these method steps.

The control units 121-123 are in FIG. 1 illustrated as forming part of one unit. These and other units may, however, be logically separated but physically implemented in the same unit or can be both logically and physically arranged together. These units may, e.g., correspond to groups of instructions, which can be in the form of programming code, that are input into, and are utilized by a processor/computing unit 601 when the units are active and/or are utilized for performing its method step, respectively.

The person skilled in the art will appreciate that the embodiments described herein for controlling braking of a vehicle may also be implemented in a computer program, which, when it is executed in a computer, instructs the computer to execute the method. The computer program is usually constituted by a computer program product 603 stored on a non-transitory/non-volatile digital storage medium, in which the computer program is incorporated in the computer-readable medium of the computer program product. The computer-readable medium comprises a suitable memory, such as, e.g.: Read-Only Memory ROM, Programmable Read-Only Memory PROM, Erasable PROM EPROM, Flash memory, Electrically Erasable PROM EEPROM, a hard disk unit, etc.

Finally, the invention is not limited to the above-described embodiments, but the invention relates to, and encompasses, all of the different embodiments that are included within the scope of the independent claims.

The invention claimed is:

1. A method performed by a control arrangement for controlling braking of a vehicle, the vehicle comprising:

a service brake system comprising one or more friction brakes for applying a first brake torque to at least non-driven wheels of the vehicle;

at least one auxiliary brake system for applying a second brake torque to at least driven wheels of the vehicle, said at least one auxiliary brake system comprising an engine brake, an exhaust brake, an electromagnetic retarder, or a hydraulic retarder; and driver maneuverable means for inputting by a driver a requested brake torque to be applied by the service brake system, the method comprising, when the requested brake torque has been input by means of the driver maneuverable means, and when a temperature of one or more friction brakes of the service brake system increases, or is expected to increase, to a first temperature:

reducing the first brake torque applied by the service brake system; and increasing the second brake torque applied by the at least one auxiliary brake system such that a total resulting brake torque from the service brake system and the at least one auxiliary brake system corresponds to the requested brake torque.

2. A method according to claim 1, wherein the second brake torque applied by the at least one auxiliary brake system is limited to a first torque limit, the method further comprising:

increasing the first torque limit to a second, higher, torque limit when the temperature of one or more of the friction brakes of the service brake system increases, or is expected to increase, to the first temperature.

3. A method according to claim 1, further comprising, when the requested brake torque is received:

applying the first brake torque by means of the at least one auxiliary brake system; and when the temperature of the one or more friction brakes of the service brake system increases, or is expected to increase, to the first temperature:

decreasing the first brake torque applied by means of the service brake system; and increasing the second brake torque by means of the at least one auxiliary brake system.

4. A method according to claim 1 further comprising:

increasing an amount of the second brake torque being applied by means of the at least one auxiliary brake system based on the extent to which the temperature of one or more friction brakes of the service brake exceeds: (i) the first temperature, and/or (ii) a rate of change of the temperature of one or more friction brakes of the service brake system.

5. A method according to claim 4, further comprising:

increasing the second brake torque applied by the at least one auxiliary brake system by a first increase when the temperature of one or more friction brakes of the service brake system increases to the first temperature; and increasing the second brake torque applied by the at least one auxiliary brake system by a second, higher than the first, increase when the temperature of one or more friction brakes of the service brake system increases to a second, higher than the first, temperature.

6. A method according to claim 1, further comprising:

increasing the first temperature at which the second brake torque is applied by the at least one auxiliary brake system when data relating to the upcoming road in front of the vehicle indicates a reduced need for brake torque.

7. A method according to claim 1, further comprising:

increasing the second brake torque applied by the at least one auxiliary brake system when it is estimated that the temperature of one or more of the friction brakes of the service brake system will exceed the first temperature within a first period of time.

8. A method according to claim 7, wherein the temperature of one or more of the friction brakes of the service brake system is estimated at least partly based on information related to an inclination of the upcoming road in front of the vehicle.

9. A method according to claim 7, wherein the temperature of one or more of the friction brakes of the service brake system is estimated at least partly based on a current driver behavior, wherein it is assumed that the driver maintains a current behavior during a period of time for which the temperature is estimated.

10. A method according to claim 1, wherein the driver maneuverable is a brake pedal, wherein the driver requests brake torque by depressing the brake pedal.

11. A method according to claim 1, wherein the temperature of one or more of the friction brakes of the service brake system is an estimated temperature, and/or a temperature obtained through the use of a temperature sensor.

12. A control arrangement for controlling braking of a vehicle, the vehicle comprising:

a service brake system comprising one or more friction brakes for applying a first brake torque to at least non-driven wheels of the vehicle;

at least one auxiliary brake system for applying a second brake torque to at least driven wheels of the vehicle, said at least one auxiliary brake system comprising an engine brake, an exhaust brake, an electromagnetic retarder, or a hydraulic retarder; and driver maneuverable means for inputting by a driver a requested brake torque to be applied by the service brake system, the control arrangement being configured to, when the requested brake torque has been input by means of the driver maneuverable means, and when a temperature of one or more friction brakes-a friction brake of the service brake system increases, or is expected to increase, to a first temperature:

reduce the first brake torque applied by the service brake system; and increase the second brake torque applied by the at least one auxiliary brake system such that a total resulting brake torque from the service brake system and the at least one auxiliary brake system corresponds to the requested brake torque.

13. A control arrangement according to claim 12, wherein part of the brake torque requested by the driver by means of the driver maneuverable means is applied by the at least one auxiliary brake system, wherein the maximum available brake torque to be applied by the at least one auxiliary brake system is limited to a first torque limit, the control arrangement further configured to:

increase the first torque limit to a second, higher, torque limit when the temperature of one or more of the friction brakes of the service brake system increases, or is expected to increase, to the first temperature.

14. A control arrangement according to claim 12, further configured to, when the first brake torque is requested:

apply the first brake torque by means of the at least one auxiliary brake system; and when the temperature of the one or more friction brakes of the service brake system increases, or is expected to increase, to the first temperature:

decrease the first brake torque applied by means of the service brake system; and increase the second brake torque by means of the at least one auxiliary brake system.

15. A control arrangement according to claim 12 further configured to:

increase an amount of the second brake torque being applied by means of the at least one auxiliary brake system based on the extent to which the temperature of one or more friction brakes of the service brake exceeds: (i) the first temperature, and/or (ii) a rate of change of the temperature of one or more friction brakes of the service brake system.

16. A control arrangement according to claim 15, further configured to:

increase the second brake torque applied by the at least one auxiliary brake system by a first increase when the temperature of one or more friction brakes of the service brake system increases to the first temperature; and increase the second brake torque applied by the at least one auxiliary brake system by a second, higher than the first, increase when the temperature of one or more friction brakes of the service brake system increases to a second, higher than the first, temperature.

17. A control arrangement according to claim 12, further configured to:

increase the first temperature at which the second brake torque is applied by the at least one auxiliary brake system when data relating to the upcoming road in front of the vehicle indicates a reduced need for brake torque.

18. A control arrangement according to claim 12, further configured to:

increase the second brake torque applied by the at least one auxiliary brake system when it is estimated that the temperature of one or more of the friction brakes of the service brake system will exceed the first temperature within a first period of time.

19. A vehicle comprising a control arrangement for controlling braking of the vehicle, the vehicle comprising:

a service brake system comprising one or more friction brakes for applying a first brake torque to at least non-driven wheels of the vehicle;

at least one auxiliary brake system for applying a second brake torque to at least driven wheels of the vehicle, said at least one auxiliary brake system comprising an engine brake, an exhaust brake, an electromagnetic retarder, or a hydraulic retarder; and driver maneuverable means for inputting by a driver a requested brake torque to be applied by the service brake system, the control arrangement being configured to, when the requested brake torque has been input by means of the driver maneuverable means, and when a temperature of one or more friction brakes of the service brake system increases, or is expected to increase, to a first temperature:

reduce the first brake torque applied by the service brake system; and increase the second brake torque applied by the at least one auxiliary brake system such that a total resulting brake torque from the service brake system and the at least one auxiliary brake system corresponds to the requested brake torque.

20. A computer program product stored on a non-transitory computer-readable medium, said computer program product for controlling braking of a vehicle, the vehicle comprising: a service brake system comprising one or more friction brakes for applying a first brake torque to at least non-driven wheels of the vehicle; at least one auxiliary brake system for applying a second brake torque to at least driven wheels of the vehicle, said at least one auxiliary brake system comprising an engine brake, an exhaust brake, an electromagnetic retarder, or a hydraulic retarder; and driver maneuverable means for inputting by a driver a requested brake torque to be applied by the service brake system, wherein said computer program product comprising computer instructions to cause one or more computing devices to, when the requested brake torque has been input by means of the driver maneuverable means, and when a temperature of one or more friction brakes of the service brake system increases, or is expected to increase, to a first temperature:

reduce the first brake torque applied by the service brake system; and increase the second brake torque applied by the at least one auxiliary brake system such that a total resulting brake torque from the service brake system and the at least one auxiliary brake system corresponds to the requested brake torque.

* * * * *